////// 3,399,965
PRODUCTION OF 68 TO 70% NITRIC ACID

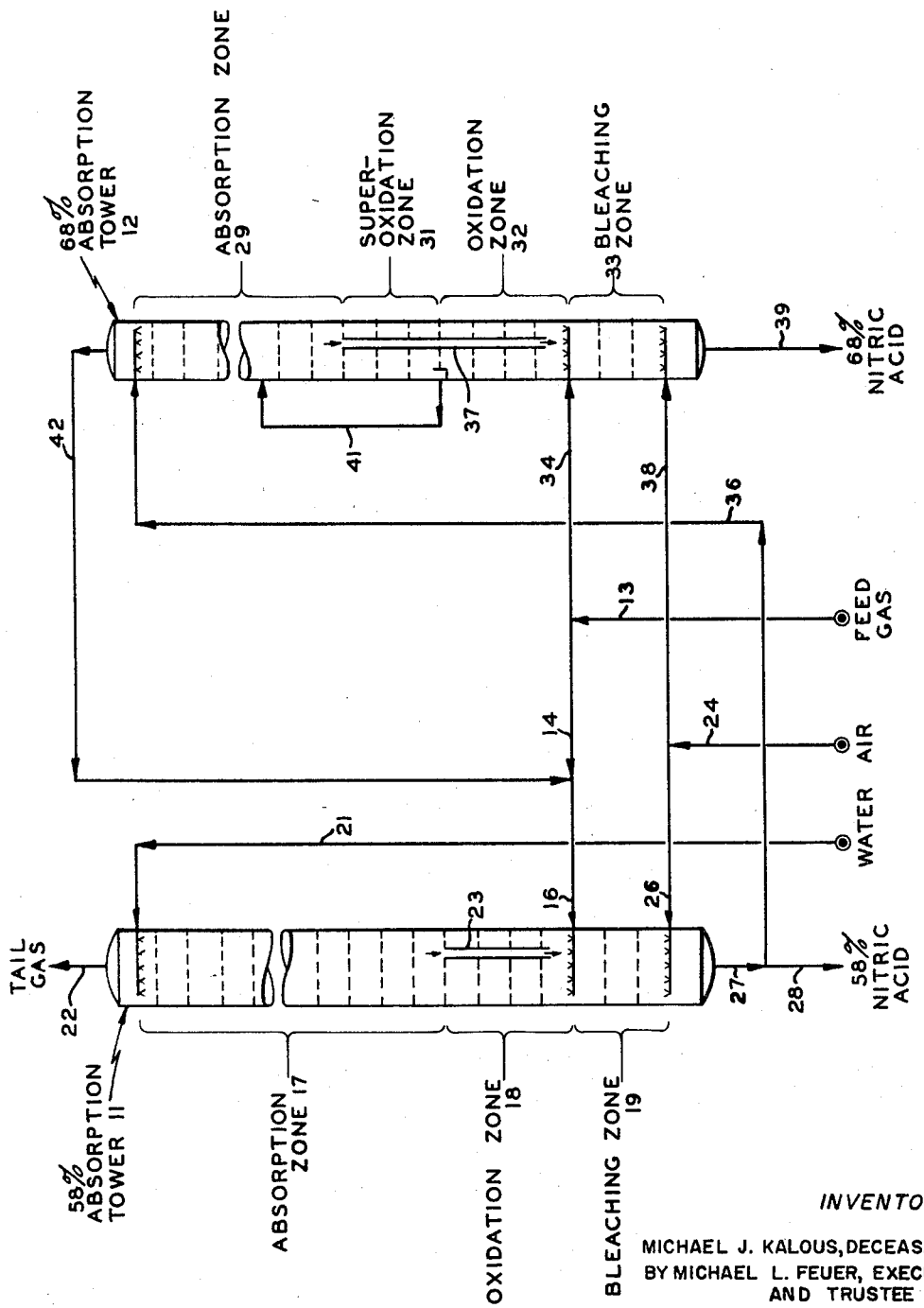

Michael Joseph Kalous, deceased, late of Niagara Falls, Ontario, Canada, by Michael L. Feuer, executor and trustee, Toronto, Ontario, Canada, assignor to Pullman Incorporated, a corporation of Delaware
Filed Sept. 11, 1963, Ser. No. 308,624
5 Claims. (Cl. 23—162)

ABSTRACT OF THE DISCLOSURE

Part of the production of an existing nitric acid plant producing acid of nominal 58% strength is diverted to the production of 68 to 70% nitric acid by contacting part of the cooled burner gas from the existing plant with 68–70% nitric acid under conditions which oxidize nitric oxide in the gas to higher oxides by the reaction $$NO+2HNO_3=3NO_2+H_2O$$

to produce a gas at least 99% oxidized. The latter gas is contacted with 58% nitric acid from the existing plant to produce 68–70% nitric acid, some part of which can be used for the oxidation step mentioned.

---

This invention relates to a method for the production of 68 to 70% nitric acid. In one aspect, the invention relates to a method for diverting at least part of the production of an existing 58% (nominal) nitric acid plant to the production of 68 to 70% nitric acid.

The commercial production of nitric acid is presently based almost entirely on the oxidation of ammonia. Ammonia and air are contacted in the presence of a catalyst, which is commonly an alloy of platinum and rhodium formed into a gauze, to produce nitric oxide and water according to reaction (1):

(1) $\quad 4NH_3+5O_2+25N_2=4NO+6H_2O+25N_2$

This reaction takes place at elevated temperatures and is exothermic. The products of the reaction are cooled with the recovery of heat for use elsewhere in the process. In the course of cooling the products of reaction (1), nitric oxide reacts to some extent with additional oxygen present by reason of the excess air used to form nitrogen peroxide which in turn dimerizes to some extent, all according to reaction (2):

(2) $\quad\quad 2NO+O_2=2NO_2=N_2O_4$

The last step of cooling is generally carried out in a heat exchanger which is referred to in the art as a gas cooler-condenser. The cold heat exchange medium is cooling water which circulates in a standard cooling water system comprising a cooling tower and cooling water pump. As a result of such cooling, some of the water present in the gas is condensed and some of the nitrogen oxides higher than nitric oxide are absorbed therein to form dilute nitric acid according to reaction (3):

(3) $\quad\quad 3NO_2+H_2O=2HNO_3+NO$

The reaction to form nitric acid may involve the absorption of $N_2O_4$ in water, reaction (3) being written based upon $NO_2$ simply by way of illustration. In any case, the reaction produces additional nitric oxide which must be reoxidized to higher oxides of nitrogen in order to make additional acid.

Oxidation reaction (2) is a very slow reaction, the equilibrium of which with respect to higher oxides is favored by low temperature. The time required for oxidation reaction (2) varies inversely as the square of the pressure so that it is common in current plants to operate the process at elevated pressures of about 80 to about 150 p.s.i.a. to reduce the space which must be made available in process equipment and piping to obtain a given degree of oxidation by reaction (2). Under the conditions used in current plants, the contact time provided by residence in piping and equipment up to and including the gas cooler-condenser produces a gas which is approximately 50% oxidized. That is, reaction (2) has proceeded to the point where about half of the nitrogen oxide content of the gas is NO and about half is $NO_2$ and $N_2O_4$.

The strength of nitric acid obtainable by absorption of $NO_2$ and $N_2O_4$ in water varies directly with the degree of oxidation of the gas. The cooled gas mixture from the gas cooler-condenser is introduced near the base of a tower provided with sufficient space to permit reaction (2) to proceed to the extent of about 95 to about 97% oxidation, i.e. sufficient time is allowed to provide a gas containing nitrogen oxides of which between about 3 and about 5 mol or volume percent is nitric oxide and of which substantially the balance are higher oxides. This degree of oxidation represents an economic optimum for conventional plants based on a balance between equipment size and acid strength. The resulting gas is then contacted countercurrently with water introduced near the top of the tower to absorb the higher oxides and to produce a nitric acid product, the nominal strength of which is 58%. The percentages given for acid strength throughout are percent by weight of acid in aqueous solution by indirect heat exchange with cooling water. The equilibrium of reaction (3) and therefore the exact strength of reaction (2) so that it is usual to cool the absorption zone by indirect heat exchange with cooling water. The equilibrium of reaction (3) and therefore the exact strength of the acid obtainable by this method depends upon temperature and with the usual seasonal fluctuations in cooling water temperature, the product acid ranges in strength from about 57% during the warm season up to about 60% or somewhat higher during the cold season.

It is frequently desirable to prepare nitric acid of substantially greater strength than can be obtained in the foregoing manner. It is particularly desirable to produce nitric acid of 68 to 70% strength for certain applications. For example, in the production of ammonium nitrate wherein nitric acid and ammonia are reacted in a neutralizer, if the nitric acid feed is of about 58% strength, the resulting ammonium nitrate product is in dilute solution and it is necessary to evaporate substantial quantities of water before the ammonium nitrate can be conveniently processed to crystal or grain form. On the other hand, if 68 to 70% nitric acid is fed, the heat of reaction generated is sufficient to evaporate in the neutralizer to such an ammonium nitrate concentration that the expense of evaporation equipment and of steam for evaporation are entirely avoided. In addition, where nitric acid is concentrated to 98% by various dehydrating agents such as concentrated sulfuric acid or magnesium nitrate, the quantity of such agents required is reduced by more than one third when starting with 68 to 70% acid as compared with 58% acid. Furthermore, the fuel consumption for reconcentration of the dehydrating agents is proportionately reduced and required equipment is smaller.

Nitric acid of 68 to 70% strength is in equilibrium with cooled gas mixtures (produced by the oxidation of ammonia with air followed by cooling with plant cooling water) provided that the gas is oxidized to the extent of at least about 99%, i.e. the nitrogen oxides present in the gas include less than about 1% nitric oxide and greater than about 99% higher oxides. Unfortunately, in order to obtain such a high degree of oxidation by extension of the method of creating long reaction times by provision of large vessel space, the reaction vessel would be extremely large and prohibitively expensive. It is also possible to obtain this high degree of oxidation by imposing relatively lower temperatures in the oxidation and absorption steps but this expedient requires auxiliary refrigeration, the equipment and power for which are so expensive as to rule this approach out as an uneconomic alternative.

It is an object of the invention to provide a method for oxidizing a gas containing nitrogen oxides to the extent of at least 99%. Specifically, it is an object of the invention to provide a method for further oxidizing to the extent of at least 99% a gas containing nitrogen oxides which is 95 to 97% oxidized.

Another object of the invention is to provide a method for the production of 68 to 70% nitric acid without resort to cooling beyond that available from plant cooling water and without resort to uneconomically large equipment.

Still another object of the invention is to provide an integrated method for diverting at least part of the production of an existing 58% nitric acid plant to the production of 68 to 70% nitric acid.

Various other objects and advantages of the invention will be apparent from the following detailed discussion and description taken with the accompanying drawing which shows in simplified flow sheet form one preferred embodiment of the invention.

The foregoing objects are achieved in accordance with the invention by passing a gas containing nitrogen oxides of which between about 3 and about 5% is nitric oxide and of which substantially the balance are higher oxides at a temperature of about 60 to about 140° F. to a contacting zone, contacting the gas with 68 to 70% nitric acid in the contacting zone maintained at a pressure of about 80 to about 150 p.s.i.a., and recovering a gas from the contacting zone containing nitrogen oxides of which less than about 1% is nitric oxide and of which substantially the balance are higher oxides. The further oxidation is achieved in the contacting zone by reason of reaction between nitric oxide and nitric acid to produce nitrogen peroxide and water according to reaction (4):

(4) 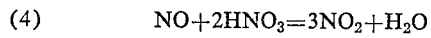  $NO + 2HNO_3 = 3NO_2 + H_2O$

The resulting further oxidized gas is contacted with water in an absorption zone maintained at a pressure of about 80 to about 150 p.s.i.a. and at a temperature of about 60 of about 40 to about 110° F., whereby 68 to 70% nitric direct heat exchange with cooling water at a temperature of about 40 to about 110° F., whereby 68 to 70% nitric acid is produced. The water supplied to the absorption zone can be supplied as such or as aqueous nitric acid of lower strength than 68 to 70%. It is preferred to operate the process with an internal recirculation involving passing a portion of the strong product acid from the absorption zone to the contacting zone to supply the 68 to 70% nitric acid used therein and passing nitric acid of reduced strength recovered from the contacting zone to the absorption zone for reconcentration.

In accordance with one aspect of the invention, 68 to 70% nitric acid is produced by the combination of steps comprising contacting ammonia and air in the presence of a catalyst at a pressure of about 80 to about 150 p.s.i.a. to produce nitric oxide and water, contacting nitric oxide so produced with oxygen at a pressure of about 80 to about 150 p.s.i.a. for a time sufficient to produce a gas containing nitrogen oxides of which between about 3 and about 5% is nitric oxide and of which substantially the balance are higher oxides, contacting this partially oxidized gas at a temperature of about 60 to about 140° F. and at a pressure of about 80 to about 150 p.s.i.a. with 68 to 70% nitric acid to further oxidize the gas and to reduce the nitric oxide content thereof to less than about 1% of the nitrogen oxides, and contacting the resulting further oxidized gas with water at a temperature of about 60 to about 140° F. and at a pressure of about 80 to about 150 p.s.i.a. to absorb oxides of nitrogen higher than nitric oxide, the latter temperature being maintained by indirect heat exchange with cooling water at a temperature of about 40 to about 110° F., whereby 68 to 70% nitric acid is produced. Again, the water supplied to the final contacting step can be supplied as such or as aqueous nitric acid of lower strength than 68 to 70%. It is also preferred in accordance with this aspect of the invention to employ an internal circulation of acid for reasons of self-sufficiency, economy and efficiency.

In accordance with another aspect of the invention, at least part of the production of an existing nitric acid plant producing acid of nominal 58% strength is diverted to the production of 68 to 70% nitric acid by an integrated process. In the 58% plant, ammonia and air are contacted in the presence of a catalyst to produce a gas containing nitrogen oxides, water, oxygen and nitrogen. This gas is cooled and partially condensed by indirect heat exchange with cooling water to produce a cooled gas mixture and a dilute nitric acid solution. Part of the cooled gas mixture is further oxidized in an oxidation zone (hereinafter referred to as a first oxidation zone) to the extent of about 95 to about 97% and then countercurrently contacted with water in an absorption zone (hereinafter referred to as a first absorption zone) to produce nitric acid of nominal 58% strength. To make acid of 68 to 70% strength, another part of the cooled gas mixture is passed to a separate oxidation zone (hereinafter referred to as the second oxidation zone) and there further oxidized to the extent of about 95 to about 97%. Further oxidized gas from the second oxidation zone is contacted with 68 to 70% nitric acid in a superoxidation zone to oxidize the gas still further to the extent of at least 99%. This still further oxidized gas from the superoxidation zone is contacted with at least part of the nitric acid of nominal 58% strength from the first absorption zone in a separate absorption zone (hereinafter referred to as the second absorption zone), whereby nitric acid of 68 to 70% strength is produced. In accordance with this aspect, it is preferred also to employ an internal circulation of acid between the second absorption zone and the superoxidation zone for reasons of self-sufficiency, economy and efficiency. In addition, it is preferred to recycle unabsorbed gas from the second absorption zone to join the cooled gas mixture passed to the first oxidation zone for maximum production of nitric acid from the nitrogen oxides.

As indicated, ammonia and air are contacted in the presence of a catalyst to produce nitric oxide and water according to reaction (1). Excess air is normally supplied so that the product gas contains some unreacted oxygen and all of the nitrogen originally supplied in the air. Any suitable catalyst can be used including one of the well known noble metal catalysts such as platinum and alloys of platinum and rhodium. The catalytic reaction is carried out at a pressure of about 80 to about 150 p.s.i.a. in order to obtain the advantages of pressure operation throughout the plant. The reaction temperature is approximately 1650° F. which is reached in part by preheat of the reactants and in part by exothermic heat of reaction. Conditions, catalysts, and proportions of reactants are published and well known in the art and are therefore not further described. The reaction is carried out in a so-called ammonia burner and the product gas is referred to as burner gas.

The burner gas is cooled with heat recovery in a series of steps, the last of which is carried out in a gas cooler-condenser employing plant cooling water as the cold medium. The cooling steps are carried out at a pressure of about 80 to about 150 p.s.i.a., ordinarily at substantially the same pressure as that of the ammonia burner. The temperature of plant cooling water varies in the range of about 40 to about 110° F. depending in part upon the season and in part upon geographical location. The temperature of the resulting cooled gas mixture from the gas cooler-condenser will similarly vary somewhat in the range of about 60 to about 140° F. In the course of the cooling, part of the nitric oxide is oxidized to form higher oxides. As a result of cooling, some water present in the gas is condensed. The condensate absorbs some of the higher oxides producing some nitric acid of about 35 to 45% strength. The composition of the resulting cooled gas mixture is set forth in Table I below:

TABLE I

| | Approx. range, mol percent |
|---|---|
| NO | 3–7 |
| $NO_2$ | 1–6 |
| $O_2$ | 1–10 |
| $H_2O$ | 1–7 |
| $N_2$ | 84–88 |

A further description of the invention will be facilitated by reference to the accompanying drawing. As shown, there is provided a 58% absorption tower 11 and a 68% absorption tower 12. Referring first to the operation of 58% absorption tower 11, the feed gas introduced through lines 13, 14 and 16 constitutes a portion of the cooled gas mixture from the gas cooler-condenser (not shown). Tower 11 is divided into three zones including a first absorption zone 17, a first oxidation zone 18 and a first bleaching zone 19. The feed gas mixture in line 16 is introduced at the lower end of first oxidation zone 18 and rises up the tower. Sufficient space is provided in first oxidation zone 18 to permit the gas to become oxidized to the extent of about 95 to about 97%. As shown on the drawing, first oxidation zone 18 is provided with a number of trays to facilitate gas-liquid contact. The bottom tray in first absorption zone 17 and all of the trays in first oxidation zone 18 are sized to permit a small amount of 58% nitric acid to trickle down through first oxidation zone 18 and to maintain a substantially static liquid level on the trays thereof. This is done because it is found that the oxidation reaction proceeds best in an acid medium. Coils (not shown) are provided on the trays for passage of cooling water therethrough to maintain the temperature in first oxidation zone 18 at about 60 to about 140° F. Pressure throughout the tower is maintained between about 80 and about 150 p.s.i.a. and is preferably substantially the same pressure as used in the prior steps in the process.

The oxidized gas rising from first oxidation zone 18 is counter-currently contacted in first absorption zone 17 with water introduced at the upper end thereof through line 21. As the water descends in first absorption zone 17 it absorbs $NO_2$ and $N_2O_4$ with the release of heat. The nitric acid increases in strength as it descends in the tower with sufficient contact surface being provided to produce 58% nitric acid (nominal) at the base of first absorption zone 17. Cooling coils (not shown) are provided throughout between the trays of first absorption zone 17 to permit the passage of cooling water from the plant cooling system to maintain temperatures in the first absorption zone at about 60 to about 140° F. The dilute acid which is condensed and separated in the gas cooler-condenser is introduced into first absorption zone 17 by means not shown at a point of corresponding acid strength. The unabsorbed gas or tail gas is recovered in line 22 from the top of first absorption zone 17 and has the composition given in Table II below:

TABLE II

| | Approx. range, mol percent |
|---|---|
| NO | 0.1–0.3 |
| $NO_2$ | 0.05–0.15 |
| $O_2$ | 2.5–4.0 |
| $H_2O$ | 0.5–2.0 |
| $N_2$ | 95–97 |

The tail gas may be used for any desired purpose but it is particularly useful as a cooling medium for the burner gas and for the recovery of power in a turbine which can be used to drive the plant air compressor.

The bulk of the 58% nitric acid produced at the base of first absorption zone 17 bypasses oxidation zone 18 through conduit 23, and is introduced into the upper portion of first bleaching zone 19. Secondary air is introduced through lines 24 and 26 into the base of first bleaching zone 19. This air removes absorbed brown oxides from the product acid and provides part of the oxygen requirement of first oxidation zone 18 and first absorption zone 17. Clear product acid is recovered from tower 11 through lines 27 and 28.

The foregoing operation of tower 11 represents one practical process for producing 58% nitric acid. Many variations in this process are known and can be used in conjunction with the process of the invention. For example, some or all of the individual zones in tower 11 can be filled with suitable packing rather than being provided with trays. It is also apparent that many different kinds of trays can be used in the various zones including different kinds in different zones.

In accordance with the invention, a portion of the production of 58% acid from tower 11 is diverted to the production of 68 to 70% nitric acid using tower 12. The latter tower is divided into four zones including a second absorption zone 29, a superoxidation zone 31, a second oxidation zone 32 and a second bleaching zone 33. A portion of the feed gas from the gas cooler-condenser is diverted through line 34 and introduced into the base of second oxidation zone 32. The function and conditions of operation of second oxidation zone 32 are identical to those of first oxidation zone 18. In order to oxidize the gas to the extent of at least 99%, however, it is permitted to rise through superoxidation zone 31 and countercurrently contact descending nitric acid which is initially of 68 to 70% strength. A portion of the product acid of tower 11 is diverted through line 36 and introduced into the top of second absorption zone 29 to countercurrently contact the highly oxidized gas rising from superoxidation zone 31 in second absorption zone 29. As a result of this contacting in second absorption zone 29, acid of 68 to 70% strength is produced at the base thereof. Cooling coils are provided in second absorption zone 29 for the passage of plant cooling water which removes the heat of reaction and generally maintains temperatures therein of about 60 to about 140° F. Cooling coils are preferably omitted from the base of second absorption zone 29 in order to permit the strong acid produced at the base thereof to be at a temperature substantially above about 104° F. but not substantially above about 140° F. for reasons to be more fully explained hereinafter. Part of the product 68% acid bypasses superoxidation zone 31 and second oxidation zone 32 through conduit 37. This acid is bleached by means of secondary air diverted into the base of second bleaching zone 33 through line 38. The bleached acid is recovered through line 39. Another part of the product acid produced at the base of second absorption zone 29 is permitted to descend in substantial quantity in superoxidation zone 31 in order to further oxidize the ascending gas in accordance with reaction (4). The quantity of product acid which descends in superoxidation zone 31 is related to the quantity of oxidized gas rising from second oxidation zone 32 and may be expressed as the hourly ratio of mols of liquid to mols of gas ($L/V$). The $L/V$ ratio used is about 0.1 to about 1.0, preferably about 0.25 to about 0.35. Cooling coils can be provided in superoxidation zone 31 to maintain temperatures therein of about 60 to about 140° F. However, for reasons to be more fully explained hereinafter, it is preferred to do no cooling in the superoxidation zone but rather to operate this zone adiabatically, controlling the temperature of the gas and liquid entering the zone such that temperatures therein are substantially above about 104° F. but not substantially above about 140° F. As a result of the reaction in superoxidation zone 31, nitric acid of reduced strength is obtained and is collected at the base of this zone. In accordance with the preferred method of operation shown, this dilute acid is recycled through line 41 to second absorption zone 29 at a point of corresponding acid strength. In this way the production of 68 to 70% nitric acid is maximized.

The unabsorbed gas from the top of tower 12 is recovered in line 42. This gas is in equilibrium with 58% nitric acid (nominal) and so is desirably used as shown to prepare additional acid by recirculation to tower 11. It may be introduced at any of several points in tower 11 but for convenience is combined with the fresh feed gas in line 14 whereby the number of vessel nozzles and gas distribution heads is kept at a minimum. As will be appreciated operation of the process will require various pumps, valves, and control equipment. These and related items have not been shown since their importance and location will be fully understood by those skilled in the art from the foregoing.

It will also be understood that 68 to 70% nitric acid can be readily prepared directly rather than in association with a 58% plant simply by appropriately increasing the size of second absorption zone 29 of tower 12 and admitting the water into the top thereof.

Example

The invention is illustrated by reference to the following example in which tower 12 operating at a pressure slightly above 100 p.s.i.g. is added to an existing 58% nitric acid plant (tower 11 of which is shown) to produce 100 tons per stream day of 100% nitric acid as 68% solution. The amount of burner gas diverted to the 68% tower and the composition thereof at the point of leaving the gas cooler-condenser is as follows:

|  | Mols/hr. |
|---|---|
| NO | 47.0 |
| $NO_2$ | 47.0 |
| $O_2$ | 29.0 |
| $H_2O$ | 13.0 |
| $N_2$ | 954.5 |

This gas is at a pressure of about 103 p.s.i.g., a temperature of about 104° F., and is about 50% oxidized since there are equal proportions of NO and $NO_2$. Throughout the description of this example, quantities of nitrogen oxides higher than nitric oxide are indicated as $NO_2$ although it will be appreciated that some part thereof is present as other higher oxides, notably $N_2O_4$.

In the course of the passage of the gas from the gas cooler-condenser through the pipeline to the 68% tower, some oxidation takes place such that the gas entering the tower is at a temperature of about 161° F. and is 70% oxidized, having the following composition:

|  | Mols/hr. |
|---|---|
| NO | 28.2 |
| $NO_2$ | 65.8 |
| $O_2$ | 19.6 |
| $H_2O$ | 13.5 |
| $N_2$ | 954.5 |

This gas is admixed at the base of second oxidation zone 32 with secondary air at about 160° F. rising from second bleaching zone 33 in the following amount and composition:

|  | Mols/hr. |
|---|---|
| $O_2$ | 49.0 |
| $H_2O$ | 7.0 |
| $N_2$ | 189.0 |

Four plates are provided in second oxidation zone 32, spaced 2 feet apart, the tower having a diameter of 6 feet. The oxidation reaction being exothermic and favored by low temperature, cooling coils are provided on the lower three plates. Cooling water entering at 85° F. and leaving at 95° F. is circulated through these coils to cool the gas to about 104° F. in each case. Essentially static 66% nitric acid is present on the oxidation plates. At these conditions and in the volume provided, contact time is such that the gas is oxidized to the extent of about 90.8, 94.5, 96.6 and 97.3% above the respective plates in ascending order to produce gas of the following composition:

|  | Mols/hr. |
|---|---|
| NO | 2.5 |
| $NO_2$ | 91.5 |
| $O_2$ | 55.7 |
| $H_2O$ | 20.5 |
| $N_2$ | 1143.5 |

This gas is further oxidized in accordance with the invention in superoxidation zone 31 comprising three plates spaced one foot apart. This relatively close spacing is sufficient to prevent mixing of the descending acid of varying strength. Wider spacing is unnecessary since oxidation volume is not important in this zone. Accordingly, the addition of a superoxidation zone does not add greatly to the overall height and cost of the tower. The contacting surface required in the superoxidation zone can be obtained alternatively by the use of packing although the use of plates is preferred as better adapted to prevent mixing of acid of varying strengths.

A total of about 18,183 pounds per hour of 68% nitric acid is produced at the base of second absorption zone 29. Of this amount, about 8333 pounds per hour is bypassed through conduit 37 to second bleaching zone 33 and is withdrawn, after bleaching, through line 39 as product. The balance, or about 9850 pounds per hour of the 68% acid, descends through superoxidation zone 31 in countercurrent contact with the ascending gas. In this case, the hourly ratio of mols of liquid to mols of gas is about 0.29. As a result of this contacting, about 3.12 mols per hour of nitric acid react with about 1.56 mols per hour of nitric oxide yielding about 4.68 mols per hour of $NO_2$ and about 1.56 mols per hour of water. In this way, the proportion of higher nitrogen oxides is raised at the expense of nitric oxide such that the gas becomes oxidized to the extent of about 99.03%. In the space provided by the superoxidation zone, some further oxidation occurs by reaction between nitric oxide and oxygen such that the composition of the gas rising from the superoxidation zone is:

|  | Mols/hr. |
|---|---|
| NO | 0.75 |
| $NO_2$ | 96.37 |
| $O_2$ | 55.60 |
| $H_2O$ | 20.50 |
| $N_2$ | 1143.50 |

This gas is oxidized to the extent of about 99.23%.

Acid of 58% strength from the existing plant is introduced through line 36 into the upper end of absorption zone 29. It descends and countercurrently contacts the gas rising from the superoxidation zone 31. In this example second absorption zone 29 is provided with 19 plates, the top 15 of which are provided with cooling coils through which cooling water is circulated to maintain a temperature of about 104° F., favorable for absorption. The unabsorbed gas in line 42 is about 94.8% oxidized and is therefore suitably recycled to the first oxidation zone in the existing 58% tower for oxidation to about 97% and absorption for the production of 58% acid.

The equilibrium of the reaction in superoxidation zone 31 is affected by temperature. The amount of 68% nitric acid produced by the process is found to increase as the temperature of superoxidation zone 31 rises from about 104° F. up to about 140° F. At temperatures above about 140° F., the amount of 68% nitric acid produced declines. To take advantage of this effect, the temperature of the superoxidation zone should be maintained substantially above about 104° F. but not substantially above about 140° F. In this example, advantage is taken of the effect of temperature by maintaining superoxidation zone 31 at a temperature of about 124° F. This temperature is advantageously obtained without resort to extraneous heating media simply by refraining from any cooling in the superoxidation zone and in connection with the lowermost four plates in the second absorption zone. Thus, the heat released by the absorption reaction raises the temperature of the acid produced at the base of the second absorption zone to about 124° F.

Under the conditions of this example, the reaction in superoxidation zone 31 reduces the concentration of the acid to about 66%. As shown, this 66% acid is collected and recirculated through line 41 to second absorption zone 29 for reconcentration. In this case, the circulated acid is introduced onto the eighth plate (measuring from the base of the second absorption zone) where acid strength is about 66%. A small amount of the 66% acid descends through second oxidation zone 32 to maintain liquid levels on the plates therein and thereby provide the desired acid medium for the oxidation reaction therein.

It is important to note that the entire operation is carried out at a substantial positive pressure and depends only upon plant cooling water wherever cooling is required.

Having described the invention in general terms and by way of specific example, it will be understood that the many variations and alterations thereof apparent to those skilled in the art may be used without departing from the scope of the invention defined in the appended claims.

What is claimed is:

1. A method for the production of nitric acid both of nominal 58% strength and of 68 to 70% strength which comprises:
   (a) contacting ammonia and air in the presence of a catalyst at a pressure of about 80 to about 150 p.s.i.a. to produce a gas containing nitric oxide, water, oxygen and nitrogen at an elevated temperature,
   (b) cooling and partially condensing the gas resulting from step (a) at a pressure of about 80 to about 150 p.s.i.a. by indirect heat exchange with cooling water at a temperature in the range of about 40 to about 110° F. to produce a dilute nitric acid solution of about 35 to 45% strength and a cooled gas,
   (c) passing a portion of the cooled gas resulting from step (b) to a first oxidation zone and, in the presence of nitric acid of nominal 58% strength, permitting nitric oxide and oxygen in said cooled gas to react in said zone at a pressure of about 80 to about 150 p.s.i.a., a temperature of about 60 to about 140° F. and for a time sufficient to produce a gas containing nitrogen oxides of which between about 3 and about 5% is nitric oxide and of which substantially the balance is nitrogen dioxide,
   (d) contacting gas resulting from step (c) with water in a first absorption zone at a pressure of about 80 to about 150 p.s.i.a. and a temperature of about 60 to about 140° F. to produce nitric acid of nominal 58% strength,
   (e) passing another portion of the cooled gas resulting from step (b) to a second oxidation zone and, in the presence of nitric acid of about 66% strength, permitting nitric oxide and oxygen in said cooled gas to react in said second oxidation zone at a pressure of about 80 to about 150 p.s.i.a., a temperature of about 60 to about 140° F. and for a time sufficient to produce a gas containing nitrogen oxides of which between about 3 and about 5% is nitric oxide and of which substantially the balance is nitrogen dioxide,
   (f) contacting gas resulting from step (e) with nitric acid initially of 68 to 70% strength in an amount to provide an hourly ratio of mols of liquid to mols of gas of about 0.1 to about 1.0 in a superoxidation zone at a pressure of about 80 to about 150 p.s.i.a. to produce a gas containing nitrogen oxides of which at least about 99% are oxides higher than nitric oxide, and
   (g) contacting gas resulting from step (f) with nitric acid of nominal 58% strength from step (d) in a second absorption zone at a pressure of about 80 to about 150 p.s.i.a. to produce nitric acid of 68 to 70% strength.

2. A method according to claim 1 in which temperatures in said superoxidation zone are substantially above about 104° F. but not substantially above about 140° F.

3. A method according to claim 1 in which a portion of the nitric acid of 68 to 70% strength from said second absorption zone is passed to said superoxidation zone to supply 68 to 70% nitric acid used therein.

4. A method according to claim 1 in which nitric acid of reduced strength is recovered from said superoxidation zone and is passed to said second absorption zone at a point of corresponding acid strength for reconcentration.

5. A method according to claim 1 in which unabsorbed gas from said second absorption zone is recycled to join the cooled gas mixture passed to said first oxidation zone.

References Cited

UNITED STATES PATENTS

| | | | |
|---|---|---|---|
| 3,063,804 | 11/1962 | Morrow | 23—162 |
| 3,070,425 | 12/1962 | Grossmann | 23—157 |
| 3,136,602 | 6/1964 | Berger | 23—162 |

FOREIGN PATENTS

| | | |
|---|---|---|
| 311,553 | 5/1929 | Great Britain. |
| 336,233 | 9/1930 | Great Britain. |
| 569,687 | 6/1945 | Great Britain. |

OSCAR R. VERTIZ, *Primary Examiner.*

B. H. LEVENSON, *Assistant Examiner.*

UNITED STATES PATENT OFFICE
CERTIFICATE OF CORRECTION

Patent No. 3,399,965                                            September 3, 1968

Michael Joseph Kalous, deceased, by
Michael L. Feuer, executor and trustee

It is certified that error appears in the above identified patent and that said Letters Patent are hereby corrected as shown below:

Column 2, line 27, after "aqueous solu-" insert -- tion. The absorption reaction generates considerable heat which is undesirable in its effect upon the equilibrium of reaction (2) so that it is usual to cool the absorption zone --. Column 3, line 44, after "about 60" insert -- to about 140° F., this temperature being maintained by indirect heat exchange with cooling water at a temperature --; lines 46 and 47, cancel "direct heat exchange with cooling water at a temperature of about 40 to about 110° F., whereby 68 to 70% nitric". Column 7, line 39, "13.0" should read -- 13.5 --.

Signed and sealed this 3rd day of March 1970.

(SEAL)
Attest:

EDWARD M. FLETCHER, JR.                         WILLIAM E. SCHUYLER, JR.
Attesting Officer                                        Commissioner of Patents